(12) United States Patent
Yoshimura et al.

(10) Patent No.: US 7,638,220 B2
(45) Date of Patent: Dec. 29, 2009

(54) POLYMERIC LAMINATES, PROCESSES FOR PRODUCING THE SAME, AND USE THEREOF

(75) Inventors: Ken Yoshimura, Tsukuba (JP); Hiroshi Shinoda, Tsukuba (JP); Katsuhiko Iwasaki, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 764 days.

(21) Appl. No.: 10/519,198

(22) PCT Filed: Jun. 18, 2003

(86) PCT No.: PCT/JP03/07704

§ 371 (c)(1),
(2), (4) Date: Dec. 23, 2004

(87) PCT Pub. No.: WO2004/004037

PCT Pub. Date: Jan. 8, 2004

(65) Prior Publication Data

US 2006/0166047 A1 Jul. 27, 2006

(30) Foreign Application Priority Data

Jun. 28, 2002 (JP) .............................. 2002-189447
Jul. 30, 2002 (JP) .............................. 2002-220867
Mar. 31, 2003 (JP) .............................. 2003-094089

(51) Int. Cl.
*H01M 8/10* (2006.01)
(52) U.S. Cl. .............................. 429/33; 429/12; 429/42; 429/44; 429/129; 524/243
(58) Field of Classification Search .................... 429/33, 429/12, 42, 44, 129; 524/243
See application file for complete search history.

(56) References Cited

U.S. PATENT DOCUMENTS

| 4,012,303 | A | | 3/1977 | D'Agostino et al. |
| 4,605,685 | A | | 8/1986 | Momose et al. |
| 4,851,100 | A | * | 7/1989 | Hodgdon et al. ............ 204/296 |
| 5,525,436 | A | | 6/1996 | Savinell et al. |
| 5,985,477 | A | | 11/1999 | Iwasaki et al. |
| 6,087,031 | A | | 7/2000 | Iwasaki et al. |
| 7,128,993 | B2 | * | 10/2006 | Barnwell et al. .............. 429/30 |
| 7,285,616 | B2 | * | 10/2007 | Yoshimura et al. .......... 528/156 |

FOREIGN PATENT DOCUMENTS

| EP | 1519435 A1 * | 3/2005 |
| JP | 07-135004 A | 5/1995 |
| JP | 09-110982 A | 4/1997 |
| JP | 10-21943 A | 1/1998 |
| JP | 10-45913 A | 2/1998 |
| JP | 11-502249 A | 2/1999 |
| JP | 11-503262 A | 3/1999 |
| JP | 11-116679 A | 4/1999 |
| JP | 11-135136 A | 5/1999 |
| JP | 11-144745 A | 5/1999 |
| JP | 2000-268834 A | 9/2000 |
| JP | 2000-340031 A | 12/2000 |
| JP | 2002-8447 A | 1/2002 |
| JP | 2002-298867 A | 10/2002 |
| JP | 2003-173799 A | 6/2003 |
| WO | WO-2004/004037 A1 * | 1/2004 |

OTHER PUBLICATIONS

Israel Cabasso et al., "Synthesis and Characterization of Polymers with Pendent Phosphonate Groups", *Journal of Applied Polymer Science*, vol. 18, 1974, pp. 1969-1986.

Skip Gallagher, "Synthesis and Characterization of Phosphonate Containng Polysiloxanes", *Polymer Preprints*, vol. 41, No. 1, 2000, pp. 70-71.

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

The present invention relates to a laminated membrane comprising a membrane (I) which comprises aromatic polymer electrolyte containing a super strong acid group and a membrane (II) which comprises one compound selected from the group consisting of electrolytes of perfluoroalkylsulfonic acid polymer and non-super strong acid polymer, and a laminated membrane comprising a membrane (III) which comprises a perfluoroalkylsulfonic acid polymer electrolyte and a membrane (IV) which comprises a non-super strong acid polymer electrolyte. The laminated membrane of the present invention is an electrolyte membrane excellent in generation performance and excellent also in the respect of mechanical strength.

19 Claims, No Drawings

POLYMERIC LAMINATES, PROCESSES FOR PRODUCING THE SAME, AND USE THEREOF

FIELD OF THE INVENTION

The present invention relates to an electrolyte membrane, more specifically, a laminated membrane of a polymer electrolyte.

BACKGROUND OF THE TECHNOLOGY

Electrolyte membranes are used as a barrier membrane in an electrochemical device such as primary batteries, secondary batteries, solid polymer type fuel cells and the like. For example, aliphatic polymer electrolyte membranes having a perfluoroalkylsulfonic acid as a super strong acid in a side chain and a perfluoroalkyl in its main chain are conventionally used mainly because of excellent properties of a fuel cell. However, such a polymer membrane has a problem that it is deformed due to pressure applied to the surface of a cell in a fuel cell, and improvement in mechanical strength is desired.

Recently, development of inexpensive electrolyte membranes substitutable for the above-mentioned electrolyte membrane is being activated. Among others, polymer electrolyte membranes obtained by introducing a sulfonic acid group into an aromatic polyether being excellent in heat resistance and having high film strength, namely, aromatic polymer electrolyte membranes having a sulfonic group and having an aromatic main chain are promising, and for example, polymer electrolyte membranes made of sulfonated polyether ketone (Japanese Patent Application National Publication (Laid-Open) No. 11-502249), sulfonated polyether sulfone (Japanese Patent Application Laid-Open (JP-A) Nos. 10-45913, 10-21943) and the like are suggested.

However, fuel cells using these electrolyte membranes are not sufficiently satisfactory in the respects of power generation property and the like and there is a desire for improvement in an electrolyte membrane.

SUMMARY OF THE INVENTION

The present inventors have intensively studied for solving the above-mentioned problems of conventional electrolyte membranes and resultantly found that a laminated membrane obtained by laminating a membrane comprising a specific polymer electrolyte and a membrane comprising other polymer electrolyte can attain the object and shows excellent properties as a proton conductive membrane of a fuel cell and the like, further, variously investigated to complete the present invention.

Namely, the present invention relates to a laminated membrane comprising a membrane (I) which comprises aromatic polymer electrolyte containing a super strong acid group and a membrane (II) which comprises one electrolyte selected from the group consisting of electrolytes of perfluoroalkylsulfonic acid polymer and non-super strong acid polymer, and a laminated membrane comprising a membrane (III) which comprises a perfluoroalkylsulfonic acid polymer electrolyte and a membrane (IV) which comprises a non-super strong acid polymer electrolyte.

Further, the present invention provides a method of producing both the above-mentioned laminated membranes and a use thereof.

PREFERABLE MODES FOR CARRYING OUT THE INVENTION

The present invention will be illustrated in detail below.

One aspect of the laminated membrane of the present invention is a laminated membrane comprising a membrane (I) which comprises aromatic polymer electrolyte containing a super strong acid group and a membrane (II) which comprises one electrolyte selected from the group consisting of electrolytes of perfluoroalkylsulfonic acid polymer and non-super strong acid polymer.

In the present invention, the non-super strong acid polymer electrolyte or perfluoroalkylsulfonic acid polymer electrolyte is a polymer electrolyte having an ion exchange group and containing no super strong aid group, and examples of the ion exchange group of the electrolyte include cation exchange groups such as —$SO_3H$, —COOH, —$PO(OH)_2$, —POH(OH), —$SO_2NHSO_2$—, -Ph(OH) (Ph represents a phenyl group) and the like, and anion exchange groups such as —$NH_2$, —NHR, —NRR', —NRR'R''$^+$, —$NH_3^+$ and the like (R represents an alkyl group, cycloalkyl group, aryl group and the like), and the like. The ion exchange groups may partially or totally form salt(s) with counter ion(s).

Examples of the non-super strong acid polymer electrolyte include (A) polymer electrolytes as a polymer having a main chain of an aliphatic hydrocarbon and a sulfonic group and/or phosphonic group are/is introduced; (B) polymer electrolytes as a polymer of an aliphatic hydrocarbon in which hydrogen atoms in a main chain are partially substituted with fluorine and a sulfonic group and/or phosphonic group are/is introduced; (C) polymer electrolytes as a polymer having a main chain containing an aromatic ring and a sulfonic group and/or phosphonic group are/is introduced; (D) polymer electrolytes as a polymer such as polysiloxane, polyphosphazene and the like containing substantially no carbon atom in a main chain and a sulfonic group and/or phosphonic group are/is introduced; (E) polymer electrolytes as a copolymer containing of two or more repeating units selected from repeating units constituting polymers before introduction of a sulfonic group and/or phosphonic group of (A) to (D) and the polymer carrying a sulfonic group and/or phosphonic group are/is introduced; (F) polymer electrolytes containing a nitrogen atom in its main chain or side chain, and an acidic compound such as sulfuric acid, phosphoric acid and the like is introduced by ion bond; and the like.

Examples of the above-mentioned polymer electrolyte (A) include polyvinylsulfonic acid, polystyrenesulfonic acid, poly(α-methylstyrene)sulfonic acid and the like.

As the above-mentioned polymer electrolyte (B), there are mentioned sulfonic acid type polystyrene-graft-(ethylene-tetrafluoroethylene) copolymers constituted of a main chain and a hydrocarbon side chain, wherein the main chain is produced by copolymerization of a hydrocarbon fluorine vinyl monomer and a hydrocarbon vinyl monomer and the hydrocarbon side chain has a sulfonic group (ETFE, for example, JP-A No. 9-102322). As the above-mentioned polymer electrolyte (B), there are mentioned sulfonic acid type poly(trifluorostyrene)-graft-ETFE membranes obtained by graft-polymerizing α,β,β-trifluorostyrene to a membrane made of a copolymer of a hydrocarbon fluorine vinyl monomer and hydrocarbon vinyl monomer, and introducing a sulfonic group into this to give a solid polymer electrolyte membrane (for example, U.S. Pat. Nos. 4,012,303 and No. 4,605, 685), and the like.

The above-mentioned polymer electrolyte (C) may be that of which main chain contains a hetero atom such as an oxygen atom and the like, and examples thereof include those obtained by introducing a sulfonic group into a homo-polymer such as polyether ether ketone, polysulfone, polyether sulfone, poly(arylene ether), polyimide, poly((4-phenoxybenzoyl)-1,4-phenylene), polyphenylenesulfide, polyphenylquinoxalene and the like, and sulfoarylated polybenzimidazole, sulfoalkylated polybenzimidazole, phosphoalkylated polybenzimidazole (for example, JP-A No. 9-110982), phosphonated poly(phenylene ether) (for example, J. Appl. Polym. Sci., 18, 1969 (1974)) and the like.

As the above-mentioned polymer electrolyte (D), there are listed, for example, that which is obtained by introducing a sulfonic group into polyphosphazene, polysiloxane having a phosphonic group described in Polymer Prep., 41, No. 1, 70 (2000), and the like.

The above-mentioned polymer electrolyte (E) may be that obtained by introducing a sulfonic group and/or phosphonic group into a random copolymer, that obtained by introducing a sulfonic group and/or phosphonic group into an alternating copolymer, or that obtained by introducing a sulfonic group and/or phosphonic group into a block copolymer. As that obtained by introducing a sulfonic group into a random copolymer, there are listed, for example, sulfonated polyether sulfone-dihydroxybiphenyl copolymers (for example, JP-A No. 11-116679).

As the above-mentioned polymer electrolyte (F), there are listed, for example, polybenzimidazole containing phosphoric acid described in Japanese Patent Application National Publication (Laid-Open) No. 11-503262, and the like.

As specific examples of the block having a sulfonic group and/or phosphonic group in the block copolymer contained in the above-mentioned polymer electrolyte (E), there are listed, for example, blocks having a sulfonic group and/or phosphonic group described in JP-A No. 2001-250567.

On the other hand, as the perfluoroalkylsulfonic acid polymer electrolyte, there are mentioned (B') polymer electrolytes as a polymer of an aliphatic hydrocarbon in which hydrogen atoms in a main chain are totally substituted with fluorine and a sulfonic group and/or phosphonic group are/is introduced, and examples thereof include polymers having a perfluoroalkylsulfonic acid as a side chain and a perfluoroalkyl as a main chain typified by Nafion (trade mark of DuPont, the same as below).

The weight-average molecular weight of the perfluoroalkylsulfonic acid polymer electrolyte or non-super strong acid polymer electrolyte used in the present invention (hereinafter, referred to as polymer electrolyte in some cases) is usually about 1000 to 1000000, and the equivalent weight of ion exchange group is usually about 500 to 5000 g/mol.

Among the above-mentioned non-super strong acid polymer electrolytes (A) to (F), the polymer electrolytes (C) as a polymer having a main chain containing an aromatic ring and a sulfonic group and/or phosphonic group are/is introduced, are preferably used.

The membrane made of a perfluoroalkylsulfonic acid polymer electrolyte or non-super strong acid polymer electrolyte used in the present invention (hereinafter, referred to as polymer electrolyte membrane in some cases) is usually composed of a polymer electrolyte as described above, and as the production method, for example, a solvent cast method and the like can be used. Specifically, a polymer electrolyte membrane can be produced by applying a solution of a polymer electrolyte as described above on a base material to form a layer, then, removing a solvent.

Here, the base material is not particularly restricted providing it has resistance to a solvent and the membrane can be peeled after membrane formation, and usually, glass plates, PET (polyethylene terephthalate) films, stainless plates, stainless belts, silicon wafers and the like are used.

These base materials may be, if necessary, subjected to a releasing treatment, emboss processing or delustering processing on its surface. The thickness of a polymer electrolyte membrane is not particularly restricted and preferably from 10 to 300 µm. Thickness of larger than 10 µm is preferable for obtaining the thickness of a membrane which can practically use, and for decrease in membrane resistance, namely, for improvement in performance of generating electricity, thickness of smaller than 300 µm is preferable. Such membrane thickness can be controlled by the concentration of a solution or application thickness on a base material.

A solution of a polymer electrolyte is usually prepared by using a solvent capable of dissolving the above-mentioned polymer electrolyte and thereafter capable of being removed. As such a solvent, for example, aprotic polar solvents such as N,N-dimethylformamide, N,N-dimethylacetamide, N-methyl-2-pyrrolidone, dimethyl sulfoxide and the like, chlorine solvents such as dichloromethane, chloroform, 1,2-dichloroethane, chlorobenzene, dichlorobenzene and the like, alcohols such as methanol, ethanol, propanol and the like, alkylene glycol monoalkyl ethers such as ethylene glycol monomethyl ether, ethylene glycol monoethyl ether, propylene glycol monomethyl ether, propylene glycol monoethyl ether and the like, are preferably used. These can be use singly, and if necessary, two or more solvents can also be used in admixture. Of them, dimethylacetamide, methylene chloride-methanol mixed solvent, dimethylformamide, dimethyl sulfoxide are preferable due to high solubility.

As the application method, a spray method may be used, and, a bar coater method and spin coater method are preferable since a uniform layer can be formed, and particularly, a spin coater is further preferably used since a uniform thin layer can be formed.

The super strong acid group-containing aromatic polymer electrolyte used in the present invention is an electrolyte of an aromatic polymer having a super strong acid group, and a super strong acid group may exist in a side chain or main chain.

Here, the aromatic polymer means a polymer having a main chain constituted mainly of an aromatic ring, for example, a mono-cyclic aromatic ring such as benzene or the like, poly-cyclic aromatic ring such as naphthalene, biphenyl or the like, hetero-cyclic aromatic ring such as pyridine or the like, poly-cyclic hetero-cyclic aromatic ring such as benzimidazole or the like.

Such a polymer is not particularly restricted providing its main chain is constituted mainly of an aromatic ring, and for example, polymers such as polyphenylene ether, polynaphthylene, polyphenylene, polyphenylene sulfide, polyether ether ketone, polyether ether sulfone, polysulfone, polyether sulfone, polyether ketone, polybenzimidazole, polyimide and the like are listed. Of them, preferably listed are polymers such as polyphenylene ether, polyphenylene, polyether ketone, polyether ether ketone, polyether ether sulfone, polyether sulfone and the like.

An aromatic ring in these polymers may have a substituent in addition to a super strong acid group, and examples of such a substituent include alkyl groups having 1 to 6 carbon atoms such as a hydroxyl group, methyl group, ethyl group, propyl group and the like, alkoxy groups having 1 to 6 carbon atoms such as a methoxy group, ethoxy group and the like, aralkyl groups having 7 to 12 carbon atoms such as a benzyl group and the like, aryl groups such as a phenyl group, naphthyl group and the like, halogens such as a fluorine atom, chlorine atom, bromine atom and the like. A plurality of substituents may be present, and in this case, these may be different. Among others, those substituted with a fluorine atom are preferable.

When the super strong acid group-containing aromatic polymer electrolyte is an aromatic polymer having a super strong acid group in a side chain, its main chain is an aromatic polymer as described above, and a super strong acid group is present in a side chain. Here, the super strong acid group means an acid substantially stronger than 100% sulfuric acid.

Examples of such a super strong acid group include groups of the following general formulae (2a) to (2d).

$$-G-SO_3^-W^+ \quad (2a)$$

$$-G-SO_2N^-W^+SO_2-E \quad (2b)$$

$$-G-P(O)(O^-W^+)_2 \quad (2c)$$

$$-G-P(O)O^-W^+-E \quad (2d)$$

(wherein, G represents an alkylene group of which hydrogen atoms are partially or totally substituted with fluorine, aralkylene group of which hydrogen atoms are partially or totally substituted with fluorine or arylene group of which hydrogen atoms are partially or totally substituted with fluorine, $W^+$ represents a cation, E represents an alkyl group of which hydrogen atoms are partially or totally substituted with fluorine, aralkyl group of which hydrogen atoms are partially or totally substituted with fluorine or aryl group of which hydrogen atoms are partially or totally substituted with fluorine.).

Typical examples of $W^+$ include a hydrogen ion, and alkali metal ions such as a sodium ion, lithium ion and the like. When used for fuel cells, a hydrogen ion is preferable.

The alkylene group G usually has about 1 to 6 carbon atoms, the aralkylene group G usually has about 7 to 12 carbon atoms, and the arylene group G usually has about 6 to 10 carbon atoms. Of them, G is preferably an alkylene group of which hydrogen atoms are totally substituted with fluorine, aralkylene group of which hydrogen atoms are totally substituted with fluorine or arylene group of which hydrogen atoms are totally substituted with fluorine. Preferable examples of G include a difluoromethylene group, tetrafluoroethylene group, hexafluoropropylene group, hexafluorobenzylene group, tetrafluorophenylene group, hexafluoronaphthylene group and the like.

The alkyl group E usually has about 1 to 6 carbon atoms, the aralkyl group E usually has about 7 to 12 carbon atoms, and the aryl group E usually has about 6 to 10 carbon atoms. Of them, E is preferably an alkyl group of which hydrogen atoms are totally substituted with fluorine, aralkyl group of which hydrogen atoms are totally substituted with fluorine or aryl group of which hydrogen atoms are totally substituted with fluorine. Preferable examples of E include a trifluoromethyl group, pentafluoroethyl group, heptafluoropropyl group, heptafluorobenzyl group, pentafluorophenyl group, heptafluoronaphthyl group and the like.

Preferable examples of the above-mentioned super strong acid group (2a) include groups of the following formulae L-1 to L-5.

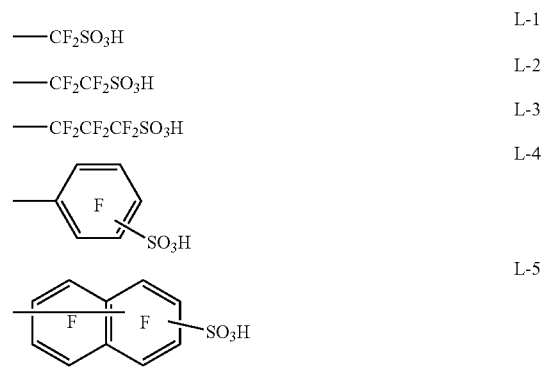

Preferable examples of the above-mentioned super strong acid group (2b) include groups of the following formulae L-6 to L-30.

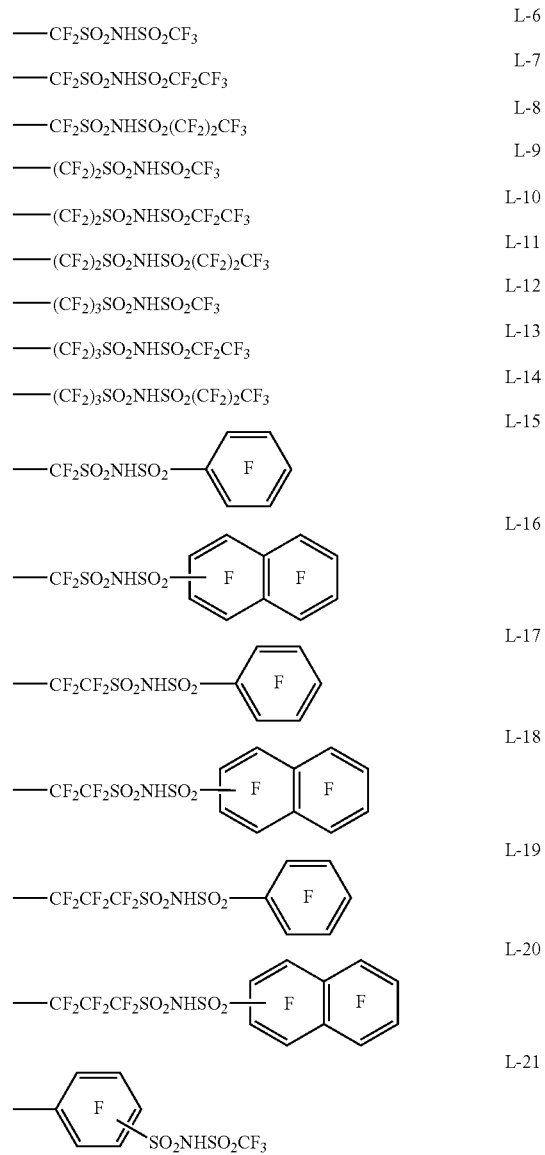

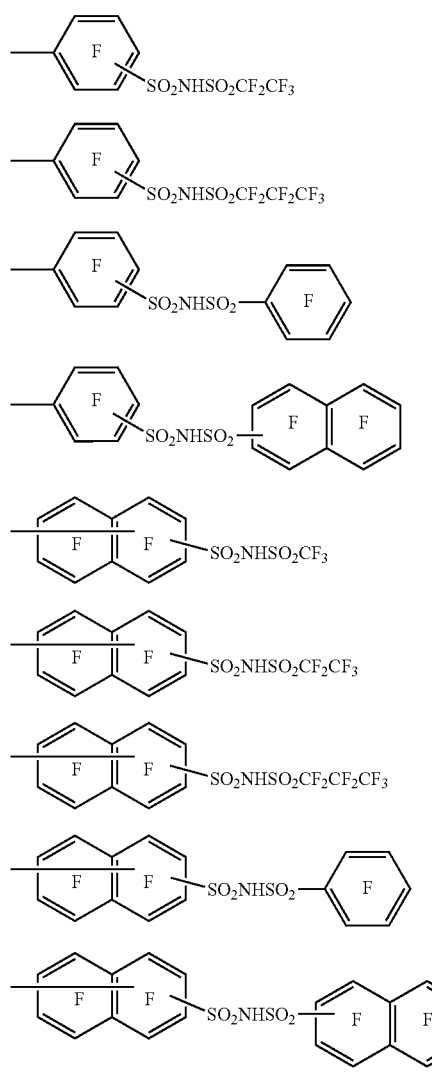
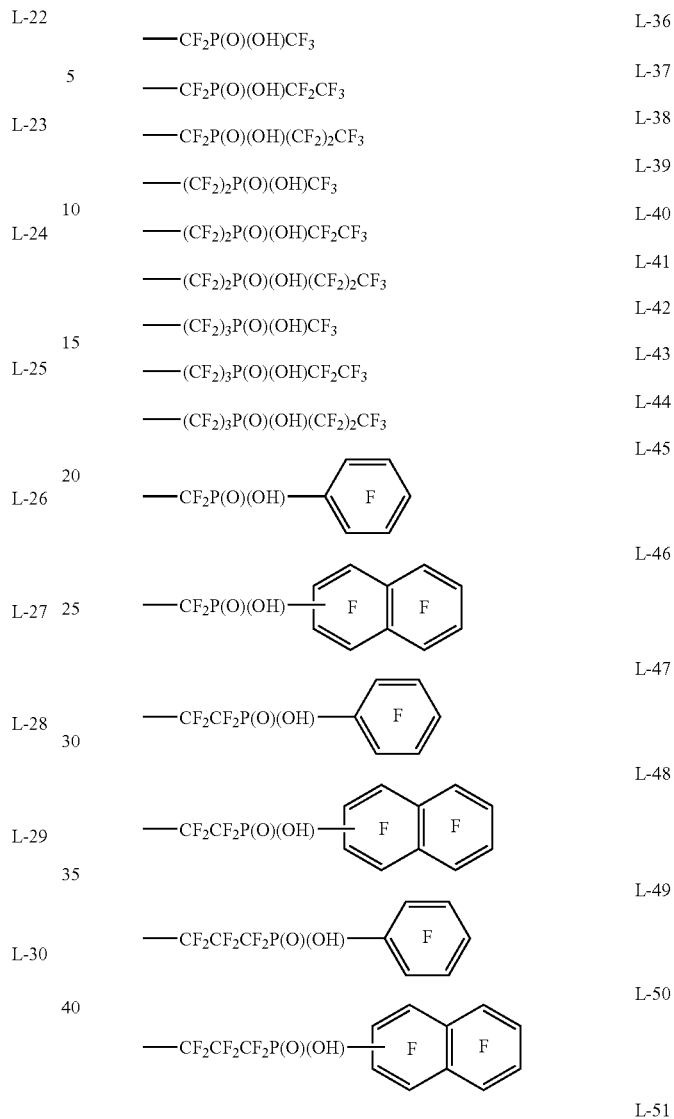
Preferable examples of the above-mentioned super strong acid group (2c) include groups of the following formulae L-31 to L-35.
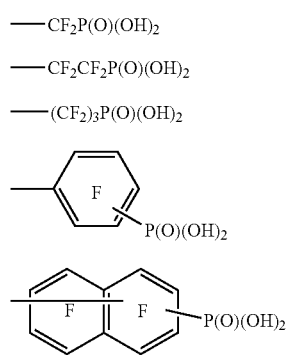
Preferable examples of the above-mentioned super strong acid group (2d) include groups of the following formulae L-36 to L-60.
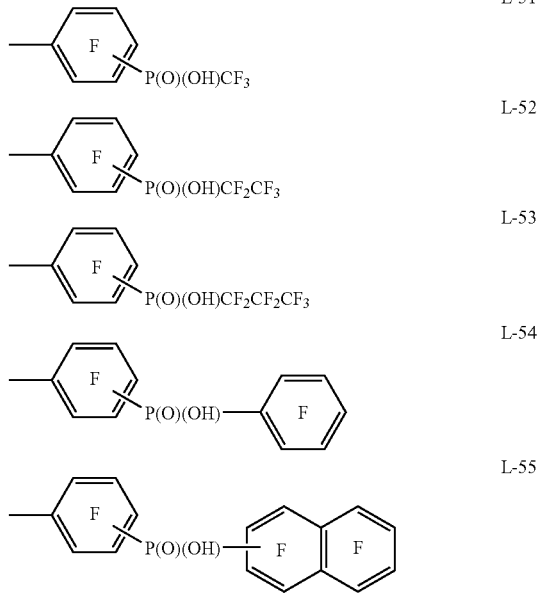

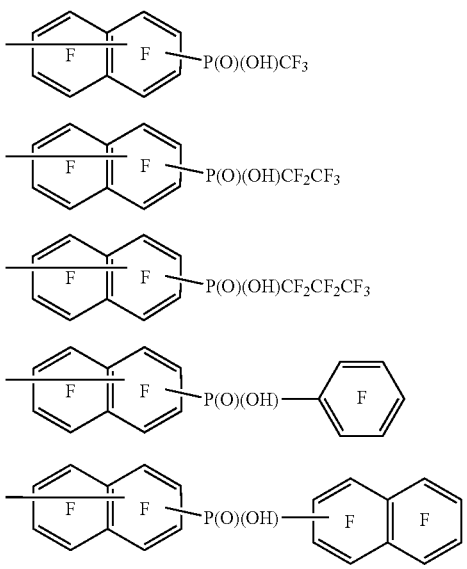

L-56
L-57
L-58
L-59
L-60

Among L-1 to L-60 as described above, L-1 to L-30 are preferably used.

Examples of aromatic polymers having a super strong acid group as described above in a side chain include polymers containing a structure of the following general formula (1).

$$-(A-Z)_m-(A'-Z')_n- \quad (1)$$

(wherein, A represents a divalent aromatic group and A' represents a divalent aromatic group on which super strong acid group has been substituted. Z, Z' represent each independently a direct bond or divalent group. m and n represent the number of repeating units, n is in the range of 10 to 100000, n repeating units may be the same as or different from each other, and m is in the range of 0 to 100000, m repeating units may be the same as or different from each other.).

Here, A represents a divalent aromatic group, and examples thereof include divalent aromatic groups selected from the following formulae (3a) to (3c).

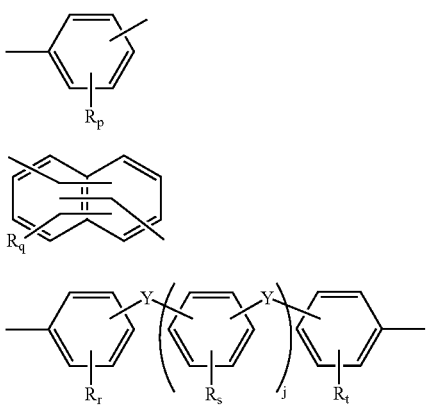

(wherein, R represents a hydroxyl group, alkyl group having 1 to 6 carbon atoms, alkoxy group having 1 to 6 carbon atoms, aralkyl group having 7 to 12 carbon atoms, aryl group or halogen. p, r, s and t represent each independently a number of from 0 to 4, and q represents a number of from 0 to 6, and when there are a plurality of Rs, these may be the same or different. j represents a number of 0 or 1. Y represent a direct bond or divalent group, and when there are a plurality of Ys, these may be the same or different.).

Examples of the alkyl group R having 1 to 6 carbon atoms include a methyl group, ethyl group, propyl group and the like, examples of the alkoxy group R having 1 to 6 carbon atoms include a methoxy group, ethoxy group and the like, examples of the aralkyl group R having 7 to 12 carbon atoms include a benzyl group, toluyl group and the like, examples of the aryl group include a phenyl group, naphthyl group and the like, and examples of the halogen include a fluorine atom, chlorine atom, bromine atom and the like.

Y represents a direct bond or divalent group, and specific examples of Y include a direct bond, —O—, —S—, —CO—, —SO$_2$—, alkylene groups having 1 to 20 carbon atoms and alkylenedioxy groups having 1 to 20 carbon atoms. Preferable are a direct bond, —O—, —S—, —SO$_2$—, alkylene groups having 1 to 10 carbon atoms and alkylenedioxy groups having 1 to 10 carbon atoms. When there are a plurality of Ys, these may be the same or different. Here, examples of the alkylene group having 1 to 20 carbon atoms include a methylene group, ethylene group, propylene group, butylene group and the like. Examples of the alkylenedioxy group having 1 to 20 carbon atoms include a methylenedioxy group, ethylenedioxy group and the like.

A' in the formula (1) represents a divalent aromatic group having substitution of a super strong acid group, and typical examples thereof include divalent aromatic groups selected from the following formulae (3d) to (3g).

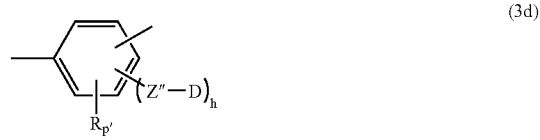

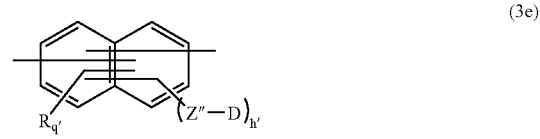

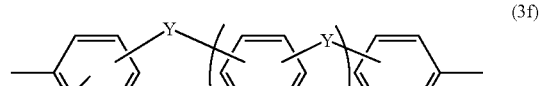

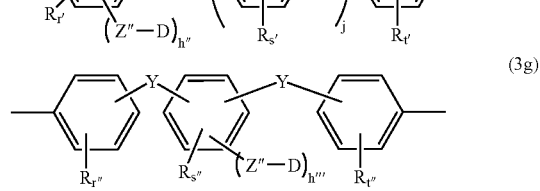

(wherein, R represents a hydroxyl group, alkyl group having 1 to 6 carbon atoms, alkoxy group having 1 to 6 carbon atoms, aralkyl group having 7 to 12 carbon atoms, aryl group or halogen. Z" and Y represent each independently a direct bond or divalent group, and when there are a plurality of Z's, these may be the same or different, and when there are a plurality of Ys, these may be the same or different. D represents a super strong acid group, and when there are a plurality of Ds, these may be the same or different. h, h" and h'" represent each independently a number of from 1 to 4, h' represents a number of from 1 to 6, (p'+h), (r'+h") and (s"+h'") represent each independently a number of from 1 to 4, s', t', r" and t" represent each independently a number of from 0 to 4, (q'+h') represents a number of from 1 to 6, when there are a plurality of Rs, these may be the same or different. j represents a number of 0 or 1. ).

Here, R and Y are the same as described for A. D represents a super strong acid group, and such super strong acid group includes super strong acid groups selected from the above-mentioned (2a) to (2d). Z" represents a direct bond or divalent group, and specific examples of Z" include alkylene groups having about 1 to 20 carbon atoms substituted with fluorine, alkylenedioxy groups having about 1 to 20 carbon atoms substituted with fluorine, arylene groups having about 6 to 12 carbon atoms optionally substituted with fluorine, aryleneoxy groups having about 6 to 12 carbon atoms optionally substituted with fluorine and alkyleneoxy groups having about 1 to 20 carbon atoms optionally substituted with fluorine, in addition to the same divalent groups as mentioned for Y such as a direct bond, —O—, —S—, —CO—, —SO$_2$—, alkylene groups having 1 to 20 carbon atoms and alkylenedioxy groups having 1 to 20 carbon atoms.

Preferably mentioned are a direct bond, —O—, —S—, —SO$_2$—, alkylene groups having 1 to 10 carbon atoms, alkylenedioxy groups having 1 to 10 carbon atoms, alkylene groups having 1 to 10 carbon atoms substituted with fluorine, alkylenedioxy groups having 1 to 10 carbon atoms substituted with fluorine, arylene groups having 6 to 10 carbon atoms optionally substituted with fluorine, aryleneoxy groups having 6 to 10 carbon atoms optionally substituted with fluorine and alkyleneoxy groups having 1 to 10 carbon atoms optionally substituted with fluorine.

Here, examples of the alkylene group having 1 to 20 carbon atoms include a methylene group, ethylene group, propylene group, butylene group and the like. Examples of the alkylenedioxy group having 1 to 20 carbon atoms include a methylenedioxy group, ethylenedioxy group and the like. Examples of the alkylene group having about 1 to 20 carbon atoms substituted with fluorine include a difluoromethylene group, tetrafluoroethylene group, hexafluoropropylene group and octafluorobutylene group. Examples of the alkylenedioxy group having 1 to 20 carbon atoms substituted with fluorine include a 2,2,3,3-tetrafluorobutylenedioxy group, 2,2-bis(trifluoromethyl)propylenedioxy group and the like. Examples of the arylene group having about 6 to 12 carbon atoms optionally substituted with fluorine include a phenylene group, tetrafluorophenylene group and the like. Examples of the aryleneoxy group having about 6 to 12 carbon atoms optionally substituted with fluorine include a phenyleneoxy group, tetrafluorophenyleneoxy group and the like. Examples of the alkyleneoxy group having about 1 to 20 carbon atoms optionally substituted with fluorine include a methyleneoxy group, difluoromethyleneoxy group, ethyleneoxy group, tetrafluoroethyleneoxy group and the like.

Z, Z' in the formula (1) represent each independently a direct bond or divalent group, and mentioned as Z, Z' are the same divalent groups as those described for Y. m, n represent the number of repeating units, n is usually in the range of 10 to 100000, n repeating units may be the same as or different from each other. m is usually in the range of 0 to 100000, m repeating units may be the same as or different from each other. n is preferably 15 or more, more preferably 20 or more. n is preferably 50000 or less, more preferably 10000 or less. m is preferably 50000 or less, particularly preferably 10000 or less. n repeating units and m repeating units may take any bonding mode of a block copolymer, random copolymer, alternating copolymer, multi-block copolymer or graft copolymer.

The number-average molecular weight of an aromatic polymer having a super strong acid group in a side chain is usually 5000 to 500000, preferably 10000 to 300000, particularly preferably 15000 to 100000.

An aromatic polymer having a super strong acid group in a side chain as described above can be obtained, for example, by reacting an aromatic polymer of the following general formula (7):

-(A-Z)$_m$-(A"-Z')$_n$-  (7)

with a moiety of the following general formula (8)

E-D  (8)

In the formula (7), A, Z, Z', m and n have the same meanings as described above, and A" represents a divalent aromatic group obtained by substituting a super strong acid group substituted in A' described above with a hydrogen atom. Examples of A" include groups selected from the following general formulae (4a) to (4d).

(4a)

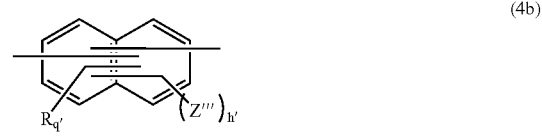

(4b)

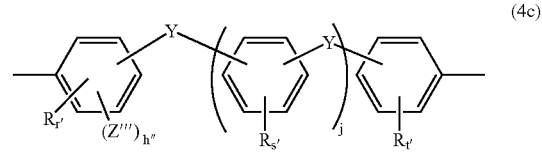

(4c)

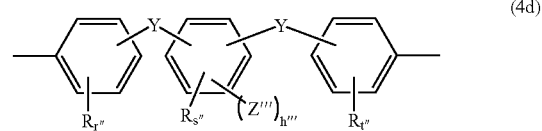

(4d)

(In the above-mentioned formulae, R, Y, p', q', r', s', t', r", s", t", h, h', h", h'" and j have the same meanings as described above, and Z'" represents a functional group.).

Here, the functional group includes halogens, hydroxyl group, nitro group, amino group, carboxyl group, carboxylic halide group, sulfonic group, sulfonic halide group, alkylene halide group, hydroxyalkylene, aryl group and the like, and preferably are halogens and hydroxyl group, and particularly preferable are halogens. As the halogen, chloro, bromo and iodo are preferable.

In the formula (8), D has the same meaning as described above, E represents a group which can form a direct bond or divalent group bonding an aromatic ring with a super strong acid group by a reaction.

The above-mentioned method is not particularly restricted, and for example a combination of, a halogen E and a halogen Z'" are reacted in the presence of a metal to form a direct bond, and other methods are mentioned. Mentioned as the halogen are fluorine, chlorine, bromine and iodine, and preferably mentioned are chlorine, bromine and iodine. Generally, the reaction can be conducted even under a condition using no solvent, and preferably, this reaction is conducted in a suitable solvent. As the solvent, hydrocarbon solvents, ether solvents, ketone solvents, amide solvents, sulfone solvents, sulfoxide solvents and the like can be used. Tetrahydrofuran, diethyl ether, dimethyl sulfoxide, sulfolane, N,N-dimethylformamide, N,N-dimethylacetamide, N-methylpyrrolidone, N,N'-dimethylimidazolidinone and the like are preferably used. As the metal, copper, sodium, lithium, potassium, zinc, iron, chromium, nickel, magnesium and the like are mentioned, and preferable are copper, zinc and sodium. The amount of a metal used is ½ equivalent or more of the sum of an alkyl halide and/or aryl halide. The reaction temperature is preferably from about −10° C. to about 25° C., more preferably from about 0° C. to about 200° C.

An aromatic polymer represented by the general formula (7) and having, for example, Z''' can be obtained by a method of introducing Z''' into an aromatic polymer by a polymer reaction, or other methods.

Mentioned as this method are, for example, a method of introducing bromine by reacting N-bromosuccinimide, a method of introducing a halogen by directly acting a chlorine gas, bromine, iodine and the like, a method of converting a hydroxyl group into bromine with phosphorus tribromide, a method of converting a hydroxyl group into chlorine with thionyl chloride, and the like (McMurray Organic Chemistry (first volume), pp. 291 to 296, Tokyo Kagaku Dojin, 1992).

The aromatic polymer into which Z''' is introduced by a polymer reaction is not particularly restricted providing its main chain is constituted mainly of an aromatic ring, and examples thereof include polymers such as polyphenylene ether, polynaphthylene, polyphenylene, polyether sulfone, polyphenylene sulfide, polyether ether ketone, polyether ether sulfone, polysulfone, polyether sulfone, polyether ketone, polybenzimidazole and the like. Of them, polyphenylene ether, polynaphthylene, polyphenylene and polyether sulfone polymers are preferably used. These polymers may be a copolymer composed of any two or more polymers such as a block copolymer, random copolymer, alternating copolymer, multi-block copolymer, graft copolymer and the like.

These polymers are available from makers such as Aldrich, Sumitomo Chemical Co., Ltd. and the like. For example, polyether sulfones commercially available under trade names of SUMIKA EXCEL PES 3600 P, PES 4100 P, PES 4800 P, PES 5200 P, PES 5003 P (all are trade marks of Sumitomo Chemical Co., Ltd., applicable also in the followings) can be obtained from Sumitomo Chemical Co., Ltd.

When the super strong acid group-containing aromatic polymer electrolyte is an aromatic polymer having a super strong acid group in its main chain, the main chain is an aromatic polymer as described above, and the main chain has further a super strong acid group. As the aromatic polymer having a super strong acid group in its main chain, examples are polymers having a polymerization unit of the following formula (4):

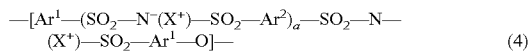

(wherein, $Ar^1$, $Ar^2$ represent each independently a divalent aromatic group optionally having a substituent, a represents an integer of 0 to 3, and $X^+$ represents an ion selected from a hydrogen ion, alkali metal ions and ammonium.).

$Ar^1$, $Ar^2$ in the formula (4) represent each independently a divalent aromatic group optionally having a substituent, and examples of the divalent aromatic group optionally having a substituent include the following groups:

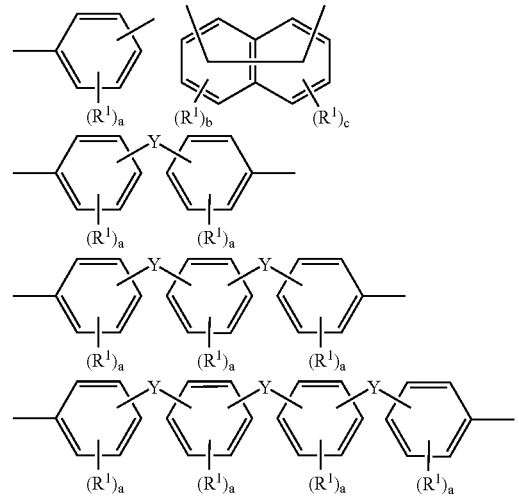

(wherein, $R^1$ represents a hydrocarbon group having 1 to 10 carbon atoms, hydrocarbonoxy group having 1 to 10 carbon atoms, acetyl group, benzoyl group, nitrile group, sulfonic group, carboxyl group, phosphonic group or halogen atom, a represents an integer of 0 to 4, and b, c represent an integer of 0 to 4, the sum of b and c is being an integer of 0 to 6. When there are a plurality of $R^1$s, these may be the same or different. Y represents a direct bond, —O—, —S—, —C(O)—, —SO$_2$— or —C($R^3$)$_2$—. $R^3$ represents a hydrogen atom, hydrocarbon group having 1 to 10 carbon atoms, halogenated hydrocarbon group having 1 to 10 carbon atoms, and two $R^3$s may be the same or different and may form a ring. When there are a plurality of Ys, these may be the same or different.).

Here, examples of the hydrocarbon group having 1 to 10 carbon atoms include a methyl group, ethyl group, propyl group, phenyl group, naphthyl group and the like. Examples of the hydrocarbonoxy group having 1 to 10 carbon atoms include a methoxy group, ethoxy group, phenoxy group and the like. As the halogen atom, fluorine, chlorine and bromine are mentioned.

As the halogenated hydrocarbon group $R^3$ having 1 to 10 carbon atoms, a trifluoromethyl group and the like are listed. As those in which two $R^3$s form a ring, for example, a cyclohexane ring, fluorene ring and the like are listed.

The degree of ion dissociation of a disulfonylimide group varies depending on adjacent aromatic groups, or substituents on $Ar^1$ and $Ar^2$, and when an electron attractive property of a substituent is higher, degree of ion dissociation is higher. Therefore, preferable $Ar^1$, $Ar^2$ are those substituted with a substituent having a high electron attractive property, for example, those having substitution of a halogen atom, and more preferable are those having substitution of a fluorine atom. Among others, it is preferable that $Ar^1$, $Ar^2$ represent tetrafluorophenylene since the degree of ion dissociation of a disulfonylimide group is high.

As $X^+$, a hydrogen ion, alkali metal ions and ammonium ion are listed, and when a laminated membrane is used in a fuel cell, it is desirable that $X^+$ is a hydrogen ion.

An aromatic polymer having a super strong acid group in its main chain comprises a polymerization unit of the formula (4) and a polymerization unit other than this, and may be an alternating copolymer, random copolymer or block copolymer.

As the preferably polymerization unit other than the polymerization unit of the formula (4), for example, a polymerization unit of the following formula (5), and the like are mentioned. Further, in addition to the polymerization unit of the formula (5), a polymerization unit other than this may be contained, and such a polymerization unit is not particularly restricted, and for example, a polymerization units of the following formula (6), and the like are mentioned.

$$—[Ar^3—O]— \quad (5)$$

$$—[Ar^4—O]— \quad (6)$$

(wherein, $Ar^3$, $Ar^4$ represent each independently a divalent aromatic group optionally having a substituent.).

Here, as the divalent aromatic group optionally having a substituent, for example, the same groups as described above are mentioned.

Polymers having a polymerization unit of the above-mentioned formulae (4) and (5) can be produced by using, for example, a compound of the following formula (9), an aromatic diol of the following general formula (10), and the like as raw materials and polymerizing them.

$$Z-Ar^1—(SO_2—N^-(X^+)—SO_2—Ar^2)_a—SO_2—N^-(X^+)—SO_2—Ar^1-Z \quad (9)$$

$$HO—Ar^3—OH \quad (10)$$

(wherein, $Ar^1$, $Ar^2$, $Ar^3$, a and $X^+$ have the same meanings as described above, and Z represents a halogen atom or a nitro group).

Here, as the halogen atom, fluorine, chlorine, bromine and the like are mentioned. Preferable are fluorine and chlorine, and more preferable is fluorine.

Typical examples of the aromatic diol (10) include hydroquinone, resorcinol, catechol, 2-methylhydroquinone, 2,6-dimethylhydroquinone, 2-methoxyhydroquinone, 2-phenylhydroquinone, 2,6-diphenylhydroquinone, 2-sulfohydroquinone, 2,6-disulfohydroquinone, 2-methylresorcinol, 2,4-dimethylresorcinol, 2-phenylresorcinol, 2,4-diphenylresorcinol, 1,2-dihydroxynaphthalene, 1,4-dihydroxynaphthalene, 1,5-dihydroxynaphthalene, 2,6-dihydroxynaphthalene, 2,7-dihydroxynaphthalene, 6,7-dihydroxy-2-naphthalenesulfonic acid, 2,7-dihydroxynaphthalene-3,6-disulfonic acid, 4,5-dihydroxynaphthalene-2,7-disulfonic acid, 4,4'-dihydroxybiphenyl, 4,4'-dihydroxy-3,3'-disulfobiphenyl, 4,4'-dihydroxy-3,3'-diphenylbiphenyl, 2,4'-dihydroxybiphenyl, 2,2'-dihydroxybiphenyl, 4,4'-dihydroxydiphenylmethane, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxyphenyl)-1,1,1,3,3,3-hexafluoropropane, 1,1-bis(4-hydroxyphenyl)-1-phenylethane, bis(4-hydroxyphenyl)diphenylmethane, 9,9-bis(4-hydroxyphenyl)fluorene, 4,4'-dihydroxydiphenyl ether, bis(4-hydroxyphenyl) sulfide, bis (3,5-dimethyl-4-hydroxyphenyl) sulfide, 4,4'-dihydroxybenzophenone, 4,4'-dihydroxydiphenylsulfone, 4,4'-dihydroxy-3,3'-disulfodiphenylsulfone, bis(3,5-dimethyl-4-hydroxyphenyl)sulfone, and alkali metal salts thereof (sodium salt, potassium salt), and the like. Two or more of them can also be used.

Of them, hydroquinone, 4,4'-dihydroxybiphenyl, 2,2-bis (4-hydroxyphenyl)propane, 4,4'-dihydroxy-3,3'-diphenylbiphenyl, 4,4'-dihydroxydiphenyl ether, and alkali metal salts thereof, and the like have high reactivity and used preferably.

A compound of the formula (9) which is another raw material can be produced as described below.

That in which a=0 can be produced easily by, for example, reacting $Z-Ar^1—SO_2Cl$ which is a corresponding sulfonyl chloride compound with $Z-Ar^1—SO_2NH_2$ which is a sulfoneamide compound. Usually, a base in an amount of 2-fold equivalent or more is added to the system and they are reacted in a solvent while controlling the pH value in the system at 7 to 8.

As the solvent, for example, acetone, 2-butanone, tetrahydrofuran, 1,4-dioxane, acetonitrile, N,N-dimethylacetamide, N,N-dimethylformamide, dimethyl sulfoxide, and a mixture of two or more of them, and the like are used. As the base, sodium hydride, lithium hydride, triethylamine, pyridine, dimethylaminopyridine and the like are used. The reaction temperature is preferably from about 0° C. to about 150° C., more preferably from about 20° C. to about 80° C. The reaction time is usually from about 1 hour to about 20 hours.

The sulfoneamide compound used here can be produced by reacting $Z-Ar^1—SO_2Cl$ which is a corresponding sulfonyl chloride compound with ammonia or ammonium chloride in the presence of a base in an amount of two-fold equivalent or more.

Among compounds of the formula (10), that in which m=1 can be produced easily, for example, by reacting $Z-Ar^1—SO_2NH_2$ which is a sulfoneamide compound with $ClSO_2—Ar^2—SO_2Cl$ which is a bissulfonyl chloride compound, or reacting $Z-Ar^1—SO_2Cl$ which is a sulfonyl chloride compound with $NH_2SO_2—Ar^2—SO_2NH_2$ which is a bissulfoneamide compound. The reaction is, when m=0 for example, carried out under the same conditions. The bissulfoneamide compound used here can be produced by reacting a corresponding bissulfonyl chloride compound with ammonia or ammonium chloride and the like.

Among compounds of the formula (10), that in which a is 2 or 3 can be produced, for example, by reacting a bissulfonyl chloride compound and bissulfoneamide compound with a sulfonyl chloride compound or sulfoneamide compound in a ternary system. The chain length of an oligomer can be controlled depending on the molar ratio of them, however, it is preferable to use a compound (3) in which a=0 or a=1 since, when a is 2 or 3, distribution occurs in chain length, purification at a stage of a compound (10) is difficult in many cases, and the molecular weight of the final polymer may not be increased easily in some cases.

Typical examples of the sulfonyl chloride compound used in producing a compound (10) include 4-fluorobenzenesulfonyl chloride, 3-fluorobenzenesulfonyl chloride, 2-fluorobenzenesulfonyl chloride, difluorobenzenesulfonyl chloride, trifluorobenzenesulfonyl chloride, tetrafluorobenzenesulfonyl chloride, pentafluorobenzenesulfonyl chloride, 4-chlorobenzenesulfonyl chloride, 3-chlorobenzenesulfonyl chloride, 2-chlorobenzenesulfonyl chloride, dichlorobenzenesulfonyl chloride, trichlorobenzenesulfonyl chloride, 4-bromobenzenesulfonyl chloride, 3-bromobenzenesulfonyl chloride, 2-bromobenzenesulfonyl chloride, dibromobenzenesulfonyl chloride, 4-nitrobenzenesulfonyl chloride, 3-nitrobenzenesulfonyl chloride and the like. Two or more of them can also be used. Further, sulfonyl fluoride compounds may also be used instead of these sulfonyl chloride compounds.

Typical examples of the bissulfonyl chloride compound used in producing a compound (10) include, 4-benzenedisulfonyl chloride, 1,3-benzenedisulfonyl chloride, 1,2-benzenedisulfonyl chloride, 4,4'-biphenyldisulfonyl chloride, naphthalenedisulfonyl chloride and the like. Two or more of them can also be used. Further, bissulfonyl fluoride compounds may also be used instead of these bissulfonyl chloride compounds.

The method of polymerizing a compound of the formula (9) and an aromatic diol of the formula (10) as described above as raw materials is not particularly restricted, and there are mentioned methods in which, for example, in the co-presence of an alkali, [1] a compound of the formula (9) and an aromatic diol of the formula (10) are reacted, [2] a compound of the formula (9), an aromatic diol of the formula (10) and a compound of the following formula (11) are reacted, [3] a compound of the formula (9) and an aromatic diol of the formula (10) are reacted, then, a compound having a hydroxyl group of the following formula (12) is reacted with the reaction product, [4] a compound of the formula (9) and an aromatic diol of the formula (10) are reacted, then, a compound of the following formula (13) is reacted with the reaction product, [5] a compound of the formula (9) and an aromatic diol of the formula (10) are reacted, then, a compound of the following formula (11) and a compound having a hydroxyl group of the following formula (12) are reacted with the reaction product, [6] a compound of the formula (9) and an aromatic diol of the formula (10) are reacted, then, an aromatic diol of the formula (10) and a compound of the following formula (13) are reacted with the reaction product, and the like.

 (11)

 (12)

 (13)

(wherein, $Ar^4$ has the same meaning as described above, $Ar^5$, $Ar^6$ represent each independently a divalent aromatic group optionally having a substituent, W represents a halogen atom or nitro group, and k represents a number of 1 to 5000.).

Here, as the halogen atom, fluorine, chlorine, bromine and the like are mentioned.

Typical examples of the compound of the formula (11) include 4,4'-difluorobenzophenone, 4,4'-dichlorobenzophenone, 2,4-difluorobenzophenone, 4,4'-dibromobenzophenone, 3,4'-dinitrobenzophenone, 4,4!-difluorodiphenylsulfone, 4,4'-difluoro-3,3'-disulfodiphenylsulfone, 4,4-difluoro-3,3'-disulfodiphenylsulfone dipotassium salt, 4,4'-difluoro-3,3'-disulfodiphenylsulfone disodium salt, 4,4'-dichlorodiphenylsulfone, 4,4-dichloro-3,3'-disulfodiphenylsulfone, 4,4'-dichloro-3,3'-disulfodiphenylsulfone dipotassium salt, 4,4'-dichloro-3,3'-disulfodiphenylsulfone disodium salt, 4,4'-dibromodiphenylsulfone, 4,4'-dinitrodiphenylsulfone, 2,6-difluorobenzonitryle, 2,6-dichlorobenzonitryle, hexafluorobenzene, decafluorobiphenyl, octafluoronaphthalene and the like.

Two or more of them can also be used.

Among them, 4,4'-difluorobenzophenone, 4,4'-difluorodiphenylsulfone, 4,4'-dichlorodiphenylsulfone, decafluorobiphenyl and the like are preferably used.

As $Ar^5$ in a compound having a hydroxyl group of the formula (12), for example, the same divalent aromatic groups optionally having a substituent as described above are mentioned. $Ar^5$ may be the same as or different from $Ar^3$, $Ar^4$ or the like. Such a compound (12) having a hydroxyl group is not particularly restricted, and examples thereof include aromatic polymers such as poly(phenylene ether), poly(ether ketone), poly(ether ether ketone), polysulfone, poly(ether sulfone), poly(phenylene sulfide) and the like having a hydroxyl group at the terminal. Two or more of them can also be used.

As $Ar^6$ in a compound of the formula (13), for example, the same divalent aromatic groups optionally having a substituent as described above are mentioned. $Ar^6$ may be the same as or different from $Ar^3$, $Ar^4$, $Ar^5$ or the like. Such a compound (13) is not particularly restricted, and examples thereof include aromatic polymers such as poly(phenylene ether), poly(ether ketone), poly(ether ether ketone), polysulfone, poly(ether sulfone), poly(phenylene sulfide) and the like having a halogen or nitro group at the terminal. Two or more of them can also be used.

The number-average molecular weight of the above-mentioned compound (12) or (13) is preferably from 2000 to 50000, more preferably from 5000 to 200000, further preferably from 8000 to 100000. When the number-average molecular weight is less than 2000, the film strength and heat resistance of a block copolymer may decrease in some cases, and when the number-average molecular weight is over 500000, solubility my decrease in some cases.

The polymerization reaction can be carried out according to known methods conducted in the presence of an alkali.

As the alkali, known alkalis having polymerization activity can be used. Preferably, alkali metal hydroxides, alkali metal carbonates and the like are used. Of them, potassium carbonate is suitably used.

The polymerization reaction may be conducted also under a melt condition using no solvent, and it is preferably conducted in a solvent. As the solvent, aromatic hydrocarbon solvents, ether solvents, ketone solvents, amide solvents, sulfone solvents, sulfoxide solvents and the like can be used, and dimethyl sulfoxide, sulfolane, N,N-dimethylformamide, N,N-dimethylacetamide, N-methylpyrrolidone, N,N'-dimethylimidazolidinone, diphenylsulfone and the like are preferably used.

The reaction temperature of the polymerization reaction is usually from about 20° C. to about 300° C., preferably from about 50° C. to about 200° C.

Another laminated membrane of the present invention is a laminated membrane comprising a membrane (III) which comprises a perfluoroalkylsulfonic acid polymer electrolyte and a membrane (IV) which comprises a non-super strong acid polymer electrolyte. The perfluoroalkylsulfonic acid polymer electrolyte and non-super strong acid polymer electrolyte used are the same as described above.

By forming a membrane (I) which comprises aromatic polymer electrolyte containing a super strong acid group as described above, a membrane (I) which comprises aromatic polymer electrolyte containing the super strong acid group can be produced. As this production method, for example, a solvent cast method and the like can be used. Specifically, a method in which a solution of an aromatic polymer having a super strong acid group is applied on a base material to form a layer, then, a solvent is removed, and the same methods as illustrated for the above-mentioned polymer electrolyte membrane, are listed.

The laminated membrane of the present invention is obtained by laminating a membrane (I) which comprises aromatic polymer electrolyte containing a super strong acid group as described above and a polymer electrolyte membrane (II) or laminating a membrane (III) which comprises a perfluoroalkylsulfonic acid polymer electrolyte and a membrane (IV) which comprises a non-super strong acid polymer electrolyte.

A method includes, for example, a method of conjugating a membrane (I) with a membrane (II), a method of applying a solution of an aromatic polymer having a super strong acid group on a membrane (II) and drying this, a method of applying a solution of a polymer electrolyte on a membrane (II) and drying this, a method of immersing a membrane (II) in a solution of an aromatic polymer having a super strong acid group and drying this, a method of immersing a membrane (I) in a solution of a polymer electrolyte and drying this, and the like.

Of them, the method of applying a solution of a polymer electrolyte on a membrane (II) and drying this is preferably used. As the method of applying and drying, the above-mentioned solvent cast method is preferably used.

When the laminated membrane of the present invention is a laminated membrane comprising a membrane (III) which comprises a perfluoroalkylsulfonic acid polymer electrolyte and a membrane (IV) which comprises a non-super strong acid polymer electrolyte, a method includes, for example, a method of conjugating a membrane (III) with a membrane (IV), a method of applying a solution of a non-super strong acid polymer electrolyte on a membrane (III) and drying this, a method of applying a solution of a perfluoroalkylsulfonic acid polymer electrolyte on a membrane (IV) and drying this, a method of immersing a membrane (III) in a solution of a non-super strong acid polymer electrolyte and drying this, a method of immersing a membrane (IV) in a solution of a perfluoroalkylsulfonic acid polymer electrolyte and drying this, and the like.

Of them, the method of applying a solution of a perfluoroalkylsulfonic acid polymer electrolyte on a membrane (IV) and drying this is preferably used. As the method of applying and drying, the above-mentioned solvent cast method is preferably used.

In this method, it is preferable that a halogen solvent such as methylene chloride, chloroform, 1,2-dichloroethane and the like is contained as the solvent of a solution of a perfluoroalkylsulfonic acid polymer electrolyte since then adhesive property of a membrane (III) and a membrane (IV) is enhanced. Further preferable is a methylene chloride/alcohol/water mixed solvent. The content of a halogen solvent is preferably 1 wt % or more based on the total amount of the solvent.

Into the above-mentioned solution containing a polymer electrolyte, an aromatic polymer having a super strong acid group or a perfluoroalkylsulfonic acid polymer electrolyte, additives such as plasticizers, stabilizers, releasing agents, water-retaining agents and the like used in polymers may be added, if necessary. The above-mentioned membranes (I) to (IV) can also be used in complex with any porous membranes for the purpose of improving its mechanical strength, and the like. Further, for the purpose of improving the mechanical strength of these membranes, a method of irradiation of electron beam, radiation and the like to cause cross-linking is known, and this method may be used on membranes (I) to (IV) and these laminated membranes.

By optionally combining the above-mentioned lamination methods, lamination of three or more layers is also possible. Specifically-listed are a membrane of alternate lamination of three or more layers of (I) and (II), a laminated membrane composed of lamination of two or more kinds of (I), and a layer of (II), a laminated membrane composed of lamination of two or more kinds of (II), and a layer of (I), a laminated membrane composed of two or more kinds of (I) layers, and two or more kinds of (II) layers, and laminated membranes combining them, and the like.

Further, a membrane of alternate lamination of three or more layers of (III) and (IV), a laminated membrane composed of lamination of two or more kinds of (III), and a layer of (IV), a laminated membrane composed of lamination of two or more kinds of (IV), and a layer of (III), a laminated membrane composed of two or more kinds of (III) layers, and two or more kinds of (IV) layers, and laminated membranes combining them, and the like are listed.

When the laminated membrane of the present invention is used as an electrolyte membrane for fuel cells, it is preferable, from the viewpoint of improvement in generation performance, that a membrane (I) constitutes a surface layer on at least one surface, and it is further preferable that it constitutes a surface layer on both surfaces.

In the laminated membrane of the present invention, the lamination amount of a membrane (I) is usually 0.1 wt % to 50 wt %, preferably 0.2 wt % to 40 wt %, particularly preferably 0.3 wt % to 30 wt % based on the total weight of the laminated membrane.

Next, the fuel cell of the present invention will be illustrated.

The fuel cell of the present invention can be produced by connecting an electrode material carrying a fixed catalyst, as a collector, on both surfaces of a laminated membrane.

As the electrode material, known materials can be used, and porous carbon woven fabric, carbon no-woven fabric or carbon paper are preferable since they transport a raw material gas to a catalyst efficiently.

The catalyst is not particularly restricted providing it can activate a redox reaction of hydrogen and oxygen, and known catalysts can be used, and it is preferable to use fine particles of platinum. Fine particles of platinum are often carried on carbon in the form of particle or fiber such as activated carbon, graphite and the like and preferably used. Platinum carried on carbon is mixed with an alcohol solution of a perfluoroalkylsulfonic acid resin to make a paste which is applied on an electrode material and/or membrane (II) or membrane (III) and dried, constituting efficiently a so-called three-phase interface in which three members of the electrode material, polymer electrolyte and fuel gas are in mutual contact, thus, such a procedure is preferably used. Specifically, known methods such as, for example, a method described in J. Electrochem. Soc.: Electrochemical Science and Technology, 1988, 135 (9), 2209, and the like can be used.

EXAMPLES

The following examples will illustrate the present invention further specifically, however, the scope of the invention is not limited to these examples.

Physical properties in examples and comparative examples were measured according to the following evaluation methods.

[Evaluation Method]

Evaluation of Fuel Cell Properties

A platinum catalyst carried on a carbon was mixed with a lower alcohol solution (containing 10 wt % water) (manufactured by Aldrich) of Nafion (registered trade mark of Dupont) to give a paste which was applied on porous carbon woven-fabric as an electrode material and dried, to obtain a current collector as an electrode material carrying a fixed catalyst. This current collector was attached on both surfaces of the membrane, obtaining a collector-membrane assembly. A wet oxygen gas was flown to one surface of the connected body and a wet hydrogen gas was flown to another surface, the connected body was kept at 80° C., and its power generation property was measured.

Evaluation of Adhering Property

After evaluation of the fuel cell property, the collector-membrane assembly was removed, and the carbon woven-fabric was peeled from the membrane, and if the catalyst layer was connected to the carbon woven-fabric or to the membrane was checked.

Tensile Test

This was measured at a test speed of 10 mm/min under 23° C. and a relative humidity of 50% according to Japan Industrial Standard (JIS K 7127).

Reference Example 1

Synthesis of Aromatic Polymer Having Super Strong Acid Group In Side Chain

Into a flask was charged 40 g of commercially available poly(oxy-4,4'-biphenyleneoxy-4,4'-diphenylsulfone) and 500 ml of methylene chloride, and to this mixture was added 37.4 g (210 mmol) of N-bromosuccinimide, and 65.4 g of concentrated sulfuric acid was dropped over 30 minutes while keeping the temperature of the flask at 0° C. and stirring. After stirring for 4 hours at room temperature, the reaction solution was poured into ice water, and 7.56 g (60 mmol) of $Na_2SO_3$ was added. Thereafter, an aqueous NaOH solution was added until pH reached 10, then, methylene chloride was distilled under reduced pressure, filtrated and dried, to obtain 63.1 g of a polymer (a). Elemental analysis, $^1$H-NMR and $^{13}$C-NMR measurements were conducted to find that a bromo group had been introduced into a phenyl ring of the resulted polymer (a). The polymer (a) contained bromo groups introduced in an amount of 27 wt %. The molecular weight was measured by GPC measurement using N,N-dimethylacetamide (hereinafter, referred to as DMAc) as a developing solvent, to find a number-average molecular weight of 34000 based on a polystyrene calibration standard.

Into a flask was charged 15.01 g of 5-iodo-octafluoropentyl-3-oxapentanesulfonyl fluoride, 5 ml of water, 5 ml of methylene chloride, 4.80 g of 2,6-lutidine, and 0.1 ml of 1M THF solution of tetra n-butyl ammonium fluoride, and they were allowed to react for 4 days at room temperature. The reaction mixture was extracted with methylene chloride three times, and the solvent was distilled under reduced pressure, then, 30 ml of THF and 2.82 g of potassium carbonate were added to this and the mixture was stirred at room temperature for 10 hours. The solid was filtrated, and the filtrate was concentrated to cause deposition of white solid. The white solid was re-crystallized from a THF/toluene mixed solvent to obtain 12.3 g of white solid. The resulted white solid was identified as potassium 5-iodo-octafluoro-3-oxapentanesulfonate (b) by the results of $^{19}$F-NMR, and elemental analysis.

Into a flask of which air inside had been purged with nitrogen was charged 0.500 g of the polymer (a), 0.500 g (7.87 mmol) of a copper powder and 10 ml of dimethyl sulfoxide, and the mixture was stirred at 120° C. for 2 hours. Then, 10 ml of a dimethyl sulfoxide solution of 1.00 g (2.16 mmol) of the compound (b) was added while keeping at 120° C. They were reacted at 120° C for 40 hours, then, poured into 100 ml of a 1N-HCl aqueous solution to precipitate a polymer. The precipitated polymer was dried to obtain an aromatic polymer (c) having a super strong acid group in a side chain.

Reference Example 2

Synthesis of Sulfonated Aromatic Polymer 99 mg of anhydrous cupper chloride and 266 mg of 2-methylbenzoxazole were stirred in 1 ml of toluene at room temperature under atmospheric pressure for 15 minutes. To this was added 8.5 g of 2-phenylphenol and 30 ml of toluene, and the mixture was stirred at 50° C for 5 hours under an oxygen atmosphere. After completion of the reaction, the reaction solution was poured into methanol acidified with hydrochloric acid to precipitate a polymer which was filtrated and dried to obtain poly(2-phenylphenylene ether) (hereinafter, referred to as PE1).

Into a flask equipped with an azeotropic distillation apparatus was charged 3.0 g of SUMIKA EXCEL PES 5003 P (manufactured by Sumitomo Chemical Co., Ltd., polyether sulfone having hydroxyl group at the end), 0.75 g of PE1, 0.04 g of potassium carbonate, 15 ml of DMAc and 3 ml of toluene and the mixture was stirred with heating and dehydrated under azeotropic conditions of toluene and water, then, toluene was distilled off. To this was added 0.05 g of 4,4'-difluorobenzophenone, and the mixture was stirred for 5 hours while heating at 160° C. There action solution was dropped into large amount of methanol acidified with hydrochloric acid, the resulted precipitate was recovered by filtration, and dried under reduced pressure at 80° C to obtain 3.8 g of a block copolymer.

2 g of the resulted block copolymer was stirred together with 20 ml of 98% sulfuric acid at room temperature, to give a uniform solution, then, the solution was stirred further for 2 hours. The resulted solution was dropped into large amount of ice water, and the resulted precipitate was recovered by filtration. Further, mixer washing with ion-exchange water was repeated until the washing water became neutral, then, the mixture was dried under reduced pressure at 40° C to obtain a sulfonated aromatic polymer (d).

Reference Example 3

Production of Polymer Electrolyte Membrane by Complex Formation of Sulfonated Aromatic Polymer and Porous Membrane of Polyethylene The polymer (d) was dissolved at a concentration of 15 wt % in-DMAc, and the solution was applied on a polyethylene porous membrane (membrane thickness: 15 μm, void ratio: 48%, pore diameter: 0.05 μm) fixed on a glass plate. The solvent was dried at ambient pressure, to obtain a complex membrane (e) of the sulfonated aromatic polymer and the polyethylene porous membrane of polyethylene. The membrane thickness was 27 μm.

Example 1

Production of Laminated Membrane using Spin Coater and Test of Fuel Cell Performance The membrane (e) was cut into 4 cm square, and fixed on a glass plate of a spin coater. While rotating the glass plate at 1000 rpm, 2 ml of a methylene chloride/methanol (15 vol %/85 vol%) solution (3 wt %) of the above-mentioned polymer (c) was dropped onto the center of rotation over a period of 2 seconds to conduct spin coating. This was dried for 10 minutes in a drier of 60° C, then, spin coating was conducted in the same manner also on the remaining surface, to obtain the intended laminated membrane (f). The membrane thickness was 28 μm. The results of evaluation of the properties of the membrane are shown in Table 1. The fuel cell property test result showed cell voltage when current density was 0.50 (A/cm$^2$).

Comparative Example 1

Fuel Cell Property Test of Membrane not Laminated

The property evaluation results of the membrane (e) are shown in table 1. The fuel cell property test result showed cell voltage when current density was 0.50 (A/cm$^2$).

TABLE 1

Result of evaluation of property of membrane

|  | Fuel cell property evaluation | Evaluation of adhering property |
|---|---|---|
| Example 1 | 0.58 V | adhered to both membrane and carbon woven fabric |
| Comparative example 1 | 0.48 V | adhered only to carbon woven fabric |

By coating an aromatic polymer having a super strong acid group in a side chain on a surface layer of a polymer electrolyte membrane, an adhering property of the interface between a current collector and an electrolyte membrane is improved, and the power generation property of a fuel cell is improved.

Reference Example 4 (Production Example of Sulfonated Aromatic Polymer Membrane)

The polymer (d) was dissolved in a concentration of 15 wt % in DMAc, the solution was cast and applied on a glass plate, and dried under ambient pressure to obtain a membrane (g) of a sulfonated aromatic polymer. The membrane thickness was 27 µm.

Reference Example 5 (Production Example of Disulfonylimide)

At room temperature, into an ammonium chloride aqueous solution was dropped an acetone solution of pentafluorobenzenesulfonyl chloride, and during which, pH was regulated at 7 with an aqueous sodium hydroxide solution. The precipitated product was filtrated, and re-crystallized from toluene, to obtain pentafluorobenzenesulfoneamide. The structure was confirmed by $^1$H-NMR, $^{19}$F-NMR and IR.

To a tetrahydrofuran solution of pentafluorobenzenesulfoneamide was added NaH in 2-fold molar amount, subsequently, pentafluorobenzenesulfonyl chloride of equi-molar amount was added slowly, and they were reacted at 60° C. The reaction mass was filtrated, then, the filtrate was concentrated and dissolved in methanol and to this was added a KOH methanol solution, to obtain the intended potassium salt of disulfonylimide (h). It was purified by re-crystallization from an acetone-methanol mixed solvent. $^{19}$F-NMR (ppm): −130, −142, −154.

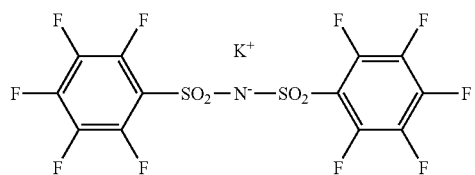

Reference Example 6 (Alternating Copolymer Composed of (h) and Hydroquinone)

Into a flask was charged, under a nitrogen flow, 2.58 g of the salt (h), 0.551 g of hydroquinone, 0.795 g of potassium carbonate and 12 ml of dimethyl sulfoxide and they were stirred while heating for 19 hours at 80° C. After completion of the reaction, the reaction solution was dropped into a 10% hydrochloric acid methanol solution, the resulted precipitate was recovered by filtration and washed with methanol, then, dried under reduced pressure at 60° C. 3.00 g of a disulfonylimide polymer (i) was obtained as brown solid.

Example 2

Production of Laminated Membrane using Spin Coater and Test of Fuel Cell Property The membrane (g) obtained by Reference Example 4 was cut into 4 cm square, and fixed on a glass plate of a spin coater. While rotating the glass plate, 2 ml of a methylene chloride/methanol (15 vol %/85 vol%) solution (3 wt %) of the above-mentioned polymer (i) was dropped onto the center of rotation over a period of 2 seconds toconduct spin coating. This was dried for 10 minutes at 60° C, then, spin coating was conducted in the same manner also on the remaining surface, to obtain the intended laminated membrane (j). The membrane thickness was 29 µm. The results of evaluation of the properties of the membrane are shown in Table 2. The fuel cell property test result showed cell voltage when current density was 0.50 (A/cm$^2$).

Comparative Example 2

Fuel Cell Property Test of Membrane not Laminated

The property evaluation results of the membrane (g) are shown in table 2. The fuel cell property test result showed cell voltage when current density was 0.50 (A/cm$^2$).

TABLE 2

Result of evaluation of property of membrane

|  | Fuel cell property evaluation | Evaluation of adhering property |
|---|---|---|
| Example 2 | 0.67 V | adhered to both membrane and carbon woven fabric |
| Comparative example 2 | 0.59 V | adhered only to carbon woven fabric |

By coating a polymer having a polymer unit of the above-mentioned formula (4) in a main chain on a surface layer of a polymer electrolyte membrane, an adhering property of the interface between a current collector and an electrolyte membrane is improved, and the power generation property of a fuel cell is improved.

Reference Example 7

Into a flask was charged under nitrogen 55.9 g (300 mmol) of 4,4'-dihydroxybiphenyl, 66.1 g (280 mmol) of m-dibromobenzene and 200 g of benzophenone and the mixture was heated at 100° C. The mixture was uniform. Further, 44.2 g of potassium carbonate and 60 mol of toluene were added to this and stirred, water generated was removed by azeotropic dehydration with toluene, and toluene was further removed. To this was added 143 mg of copper bromide (I), and the flask was heated at 200° C to carry a reaction for 6 hours. After reaction, the reaction solution was put into methanol to obtain 36 g of the precipitated polymer (k). The yield was 48%.

Then, into a flask were charged 72.0 g of SUMIKA EXCEL PES 5003 P (manufactured by Sumitomo Chemical Co., Ltd., polyether sulfone having hydroxyl group at the end) and 24.0 g of the above-mentioned polymer (k), and dissolved in 480 ml of DMAc while stirring. Further, 2.52 g of potassium carbonate and 4.81 g of decafluorobiphenyl were added and reacted at 80° C. for 4 hours, at 100° C for 2 hours and at 110° C for 1 hour. Thereafter, the reaction solution was dropped into large amount of methanol acidified with hydrochloric acid, the precipitate insoluble in methanol was recovered by filtrated, and dried under reduced pressure at 80° C to obtain 96 g of a block copolymer (1).

90 g of the resulted block copolymer (1) was dissolved in 450 ml of concentrated sulfuric acid and reacted at 60° C for 3 days, then, the reaction solution was poured into large amount of ice water, and the resulted precipitate was recovered by filtration. Further, washing with ion-exchange water was repeated until the washing liquid became neutral, then, dried under reduced pressure at 40° C to obtain a sulfonated aromatic polymer (m).

The polymer (m) was dissolved in DMAc to prepare a 15 wt % solution. The solution was applied on a glass plate, and dried at 80° C to obtained a membrane (n) of a sulfonated aromatic polymer. The thickness of the membrane (n) was 47 pin. As a result of measurement of the molecular weight by GPC measurement using DMAc as a developing solvent, the number-average molecular weight was 56000 based on a polystyrene calibration standard. The number of mole of sulfonic groups per unit weight (ion exchange capacity) of the resulted polymer was 1.62 meq/g.

Example 3

The membrane (n) was cut into 4 cm square, and fixed on a glass plate of a spin coater. While rotating the glass plate at 1000 rpm, a 5 wt % alcohol/aqueous solution (manufactured by Aldrich) of Nafion was dropped onto the center of rotation over a period of 2 seconds to conduct spin coating, and dried at 60° C. The same spin coat operation was repeated three times on the same surface. Then, spin coating was conducted in the same manner also on the opposite surface, to obtain the intended laminated membrane (p). The thickness of the membrane (p) was 53 μm. The results of evaluation of the properties of the membrane are shown in Table 3.

Example 4

The same procedure as in Example 1 was conducted except that a solution prepared by adding 4 g of methylene chloride to 3 g of 5 wt % alcohol/aqueous solution of Nafion was used and spin coating was repeated eight times on one side, to obtain a laminated membrane (q). The thickness of the membrane (q) was 55 μm. The results of evaluation of the properties of the membrane are shown in Table 3.

Comparative Example 3

The results of evaluation of the properties of the membrane (n) are shown in Table 3.

Comparative Example 4

The results of evaluation of the properties of a Nafion membrane (thickness: 50 μm) manufactured by Aldrich are shown in Table 3.

TABLE 3

| | Fuel cell property evaluation | | |
|---|---|---|---|
| | Cell voltage when current density is 0.50 A/cm$^2$ | Current density when cell voltage is 0.20 V | Evaluation of adhering property |
| Example 3 | 0.68 V | 1.96 A/cm$^2$ | adhered to both membrane and carbon woven fabric |
| Example 4 | 0.68 V | 1.80 A/cm$^2$ | adhered to both membrane and carbon woven fabric |
| Comparative example 3 | 0.61 V | 1.38 A/cm$^2$ | adhered only to carbon woven fabric |
| Comparative example 4 | 0.65 V | 1.38 A/cm$^2$ | adhered to both membrane and carbon woven fabric |

Example 5, Comparative Example 5

The tensile test was conducted on the membrane (q) and the same Nafion membrane (thickness: 50 μm) as described above. The elastic modulus of the membrane and stress at breakage of the membrane are shown in Table 4.

TABLE 4

| | Result of tensile test | |
|---|---|---|
| | Elastic modulus (MPa) | Stress at breakage (MPa) |
| Example 5 | 720 | 26 |
| Comparative example 5 | 186 | 20 |

The above-mentioned examples and comparative examples show that a laminated membrane comprising a perfluoroalkylsulfonic acid polymer membrane and non-perfluoroalkylsulfonic acid polymer electrolyte membrane shows improved adhering property of the interface between a current collector and an electrolyte membrane and manifests improved power generation property of a fuel cell. Further, when compared with a perfluoroalkylsulfonic acid polymer, this laminated membrane has also excellent mechanical properties such as high elastic modulus, high stress at breakage and the like.

INDUSTRIAL APPLICABILITY

The laminated membrane of the present invention is an electrolyte membrane excellent in power generation property and also excellent in mechanical strength.

What is claimed is:

1. A laminated membrane comprising a membrane (I) which comprises aromatic polymer electrolyte containing a super strong acid group and a membrane (II) which comprises one electrolyte selected from the group consisting of perfluoroalkylsulfonic acid polymer electrolytes and non-super strong acid polymer electrolytes.

2. The laminated membrane according to claim 1, wherein aromatic polymer electrolyte containing the super strong acid group is represented by the following general formula (1):

(wherein, A represents a divalent aromatic group and A' represents a divalent aromatic group on which super strong acid group has been substituted. Z, Z' represent each independently a direct bond or divalent group. m, n represent the number of repeating units, n is in the range of 10 to 100000, n repeating units may be the same as or different from each other, and m is in the range of 0 to 100000, m repeating units may be the same as or different from each other.

3. The laminated membrane according to claim 2, wherein A represents a divalent aromatic group selected from the following general formulae (3a) to (3c), and A' represents a divalent aromatic group selected from the following general formulae (3d) to (3g):

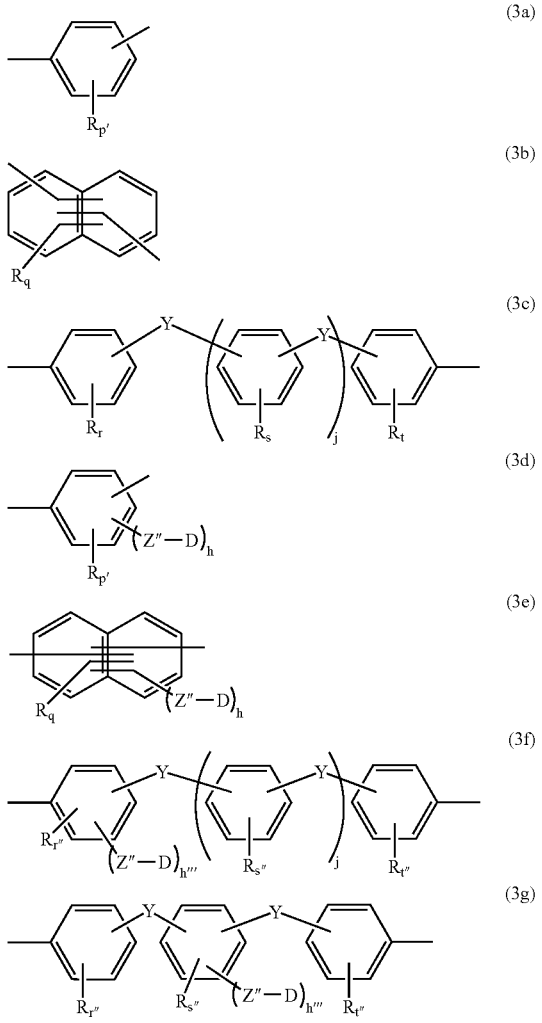

wherein, R represents a hydroxyl group, alkyl group having 1 to 6 carbon atoms, alkoxy group having 1 to 6 carbon atoms, alkyl group having 7 to 12 carbon atoms, aryl group or halogen. p, r, s and t represent each independently a number of from 0 to 4, and q represents a number of from 0 to 6, and when there are a plurality of Rs, these may be the same or different. j represents a number of 0 or 1. Y represent a direct bond or divalent group, and when there are a plurality of Ys, these may be the same or different. Z" and Y represent each independently a direct bond or divalent group, and when there are a plurality of Z"s, these may be the same or different, and D represents a super strong acid group, and when there are a plurality of Ds, these may be the same or different. h, h" and h'" represent each independently a number of from 1 to 4, h' represents a number of from 1 to 6, (p'+h), (r'+h") and (s"+h'") represent each independently a number of from 1 to 4, s', t', r" and t" represent each independently a number of from 0 to 4, (q'+h') represents a number of from 1 to 6, and j represents a number of 0 or 1.

4. The laminated membrane according to claim 3, wherein Z, Z' and Y represent each independently a group selected from a direct bond, —O—, —S—, —CO—, —SO$_2$—, alkylene groups having 1 to 20 carbon atoms and alkylenedioxy groups having 1 to 20 carbon atoms, and Z" represents a group selected from the group consisting of a direct bond, —O—, —S—, —CO—, —SO$_2$—, alkylene groups having 1 to 20 carbon atoms optionally substituted with fluorine, alkylenedioxy groups having 1 to 20 carbon atoms optionally substituted with fluorine, arylene groups having 6 to 12 carbon atoms optionally substituted with fluorine, aryleneoxy groups having 6 to 12 carbon atoms optionally substituted with fluorine and alkyleneoxy groups having 1 to 20 carbon atoms optionally substituted with fluorine.

5. The laminated membrane according to claim 2, wherein the super strong acid group is selected from group of the following general formulae (2a) to (2d):

(wherein, G represents an alkylene group of which hydrogen atoms are partially or totally substituted with fluorine, aralkylene group of which hydrogen atoms are partially or totally substituted with fluorine or arylene group of which hydrogen atoms are partially or totally substituted with fluorine, W$^+$ represents a cation, E represents an alkyl group of which hydrogen atoms are partially or totally substituted with fluorine, aralkyl group of which hydrogen atoms are partially or totally substituted with fluorine or aryl group of which hydrogen atoms are partially or totally substituted with fluorine.

6. The laminated membrane according to claim 5, wherein W represents a hydrogen ion.

7. The laminated membrane according to claim 1, wherein aromatic polymer electrolyte containing the super strong acid group is a polymer having a polymerization unit of the following formula (4):

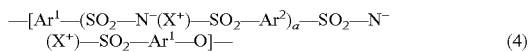

(wherein, Ar$^1$, Ar$^2$ represent each independently a divalent aromatic group optionally having a substituent, a represents an integer of 0 to 3, and X$^+$ represents an ion selected from a hydrogen ion, alkali metal ions and ammonium.

8. The laminated membrane according to claim 7, wherein aromatic polymer electrolyte containing the super strong acid group is a polymer further having a repeating unit of the following formula (5)

(wherein, Ar$^3$ represents a divalent aromatic group optionally having a substituent.)

in its main chain.

9. The laminated membrane according to claim 8, wherein aromatic polymer electrolyte containing the super strong acid group is a polymer further having a repeating unit of the following formula (6)

(wherein, $Ar^4$ represents a divalent aromatic group optionally having a substituent
in its main chain.

10. The laminated membrane according to claim 7, wherein the divalent aromatic group optionally having a substituent is at least one selected from the following aromatic groups:

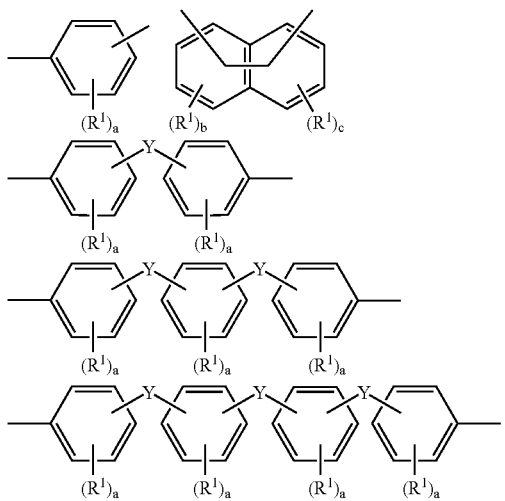

(wherein, $R^1$ represents a hydrocarbon group having 1 to 10 carbon atoms, hydrocarbonoxy group having 1 to 10 carbon atoms, acetyl group, benzoyl group, nitrile group, sulfonic group, carboxyl group, phosphonic group or halogen atom, a represents an integer of from 0 to 4, and b, c represent-an integer of from o to 4, the sum of b and c is being from 0 to 6. When there are a plurality of $R^1$s, these may be the same or different. Y represents a direct bond, —O—, —S—, —C(O)—, —SO2— or —C($R^3$)$_2$—, $R^3$ represents a hydrogen atom, hydrocarbon group having 1 to 10 carbon atoms, halogenated hydrocarbon group having 1 to 10 carbon atoms, and two $R^3$S may be the same or different and may form a ring. When there is a plurality of Ys, these may be the same or different.

11. The laminated membrane according to claim 7, wherein $Ar^1$ represents tetrafluorophenylene.

12. The laminated membrane according to claim 7, wherein a represents 0 or 1.

13. The laminated membrane according to claim 7, wherein aromatic polymer electrolyte containing the super strong acid group is a block copolymer having at least one block having a repeating unit of the formula (4) and a repeating unit of the formula (5).

14. The laminated membrane according to claim 7, wherein $X^+$ represents a hydrogen ion.

15. The laminated membrane according to claim 1, wherein the non-super strong acid polymer electrolyte is an aromatic polymer electrolyte.

16. The laminated membrane according to claim 1, wherein the membrane (II) is the surface layer on at least one surface.

17. The laminated membrane according to claim 1, wherein the proportion of the membrane (II) in the laminated membrane is 0.1 wt % to 50 wt %.

18. A fuel cell comprising the laminated membrane according to claim 1.

19. The fuel cell according to claim 18, wherein a mixture of carbon carrying a catalyst and perfluoroalkylsulfonic acid resin fixed on an electrode is used as a current collector.

* * * * *